July 25, 1961 W. S. EVERETT 2,993,559
FLUID SURGE ALLEVIATOR
Filed May 19, 1958 2 Sheets-Sheet 1

INVENTOR.
WILHELM S. EVERETT
BY Elliott & Pastoriza
ATTORNEYS

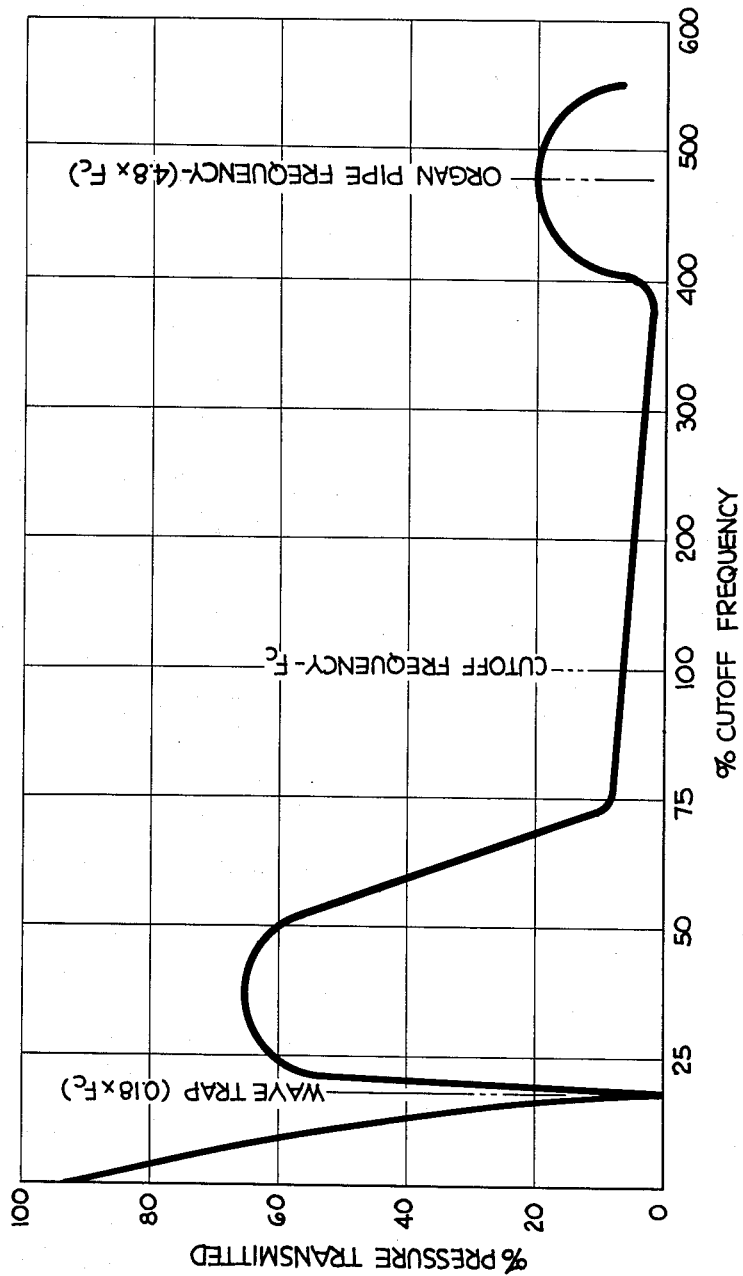

United States Patent Office 2,993,559
Patented July 25, 1961

2,993,559
FLUID SURGE ALLEVIATOR
Wilhelm S. Everett, P.O. Box 429, Santa Paula, Calif.
Filed May 19, 1958, Ser. No. 736,092
6 Claims. (Cl. 181—53)

The present invention generally relates to a fluid surge alleviator and more specifically to a surge alleviator particularly adapted for use in conjunction with the elimination of pulsations in gas and liquid lines. Such pulsations or surges, and the resultant hazardous line vibrations, are inherently present in fluid conveying systems which embody reciprocating pumps, compressors, reciprocating engines or equivalent apparatus.

Conventional pulsation dampeners oftentimes incorporate structures resulting in resistance to fluid flow with the consequent disadvantage of frictional and pressure losses. The present invention, to a great extent, employs a principle of cancellation of surges through division and subsequent re-uniting of the flow, whereby the pressure drop is relatively insignificant although a high degree of attenuation is achieved.

The apparatus of the present invention is designed to be an improvement over applicant's Patent No. 2,731,984, issued January 24, 1956, and entitled "Adjustable Surge Alleviator." Patent No. 2,731,984 was subsequently reissued on November 12, 1957, as Reissue No. 24,390. The latter referred to patent and reissue patent, although disclosing and claiming the general principle of parallel flow set forth in the present application, do not disclose certain improved features which are embodied in the surge alleviator of the present invention associated with certain fabrication and application considerations.

It is, therefore, an object of the present invention to provide a fluid surge alleviator which will, in operation, substantially attenuate pulsations in a given frequency range, and yet which is of such a simple and rugged construction that it may be very economically produced and installed.

Another object of the present invention is to provide a fluid surge alleviator, which upon proper installation will have a maintenance-free life of the same order of magnitude as the fluid line or other equipment to which it is connected.

Another object of the present invention is to provide a fluid surge alleviator which is effective to reduce hazardous line vibrations and accompanying undesirable noises.

Another object of the present invention is to provide a fluid surge alleviator which not only serves to silence line chatter or vibration, but also smooths out flow sufficiently to enable the use of pressure sensitive equipment, for example, differential meters and the like.

A still further object of the present invention is to provide a fluid surge alleviator which will have relatively small overall dimensions and yet which will comply with the aforegoing objects.

These and other objects and advantages of the present invention are generally attained by providing in a fluid surge alleviator a first chamber having an inlet port, a second chamber having an outlet port, and a central chamber. The central chamber, the first chamber, and the second chamber are disposed in axial alignment. A first fluid passage communicates from the first chamber to the central chamber, and a second fluid passage communicates from the second chamber to the central chamber. In addition, a third fluid passage communicates from the first chamber directly to the second chamber.

For purposes of further description, the first fluid passage and the second fluid passage will at times be referred to as branch lines in parallel relationship to the third fluid passage, which will sometimes be referred to as the series line.

A better understanding of the present invention will be had by reference to the drawings, illustrating a preferred embodiment, and in which.

Figure 1:
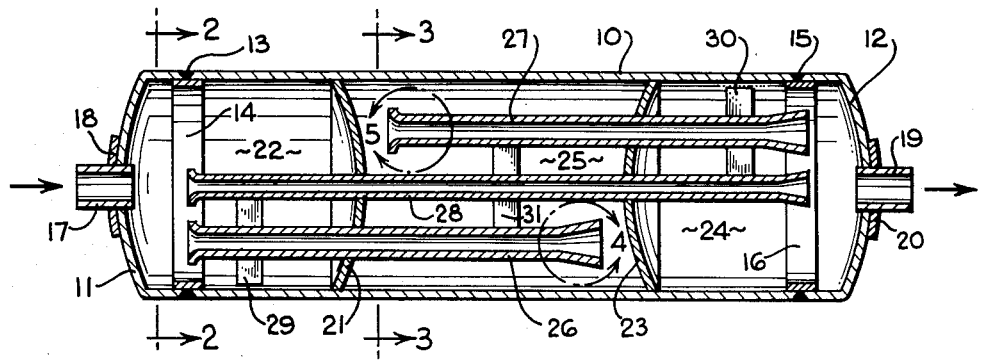
FIGURE 1 is a longitudinal sectional view of the fluid surge alleviator of the present invention taken in such a manner as to show all tubular members in section.

Referring now to FIGURE 1, there is shown a fluid surge alleviator according to the present invention including a cylindrical casing 10. The casing 10 is closed off at one end by a head or end closure 11 and at the opposite end by an end closure 12. The end closure 11 for purposes of fabrication may be welded or otherwise joined to the casing 10 at 13 by means of an annular member 14. Similarly, the end closure 12 is joined to the casing 10 at 15 through an annular member 16.

The end closure 11 is centrally provided with an inlet port 17, which in a preferred embodiment may be welded thereto and encircled by a reinforcing member 18. Similarly, at the opposite end of the casing 10, the end closure 12 is provided with an outlet port 19 buttressed by a reinforcing member 20. The inlet port 17 may be appropriately coupled to a fluid conduit or line or to outlet of a compressor or the like. The outlet 19 would be similarly coupled to a fluid line or to a compressor inlet such that the surge alleviator as a unit would be in series connection.

Within the casing 10 there is disposed a laterally extending wall 21, which defines together with the casing 10 and the end closure 11 an inlet chamber 22 for flow distribution purposes. Similarly, near the end closure 12, there is provided an inner lateral wall 23 which defines together with the casing 10 and the end closure 12 an outlet chamber 24. The wall 21 and the wall 23 define therebetween together with the casing 10 a central chamber 25. The walls 21 and 23 are preferably of the arcuate shape shown in order to achieve greater structural stability.

Extending between the chamber 22 and the chamber 25 is a first fluid passage in the form of a pipe or tubular member 26. The tubular member 26 functions as a branch circuit or line as will be clearer as the specification proceeds. Similarly, a second fluid passage or tubular member 27 extends from the chamber 25 to the chamber 24. In between the tubular member 26 and the tubular member 27, as viewed in FIGURE 1, there is disposed a third fluid passage or tubular member 28 which extends from the chamber 22 to the chamber 24 directly, thereby functioning as a series path through the surge alleviator.

Figure 2:
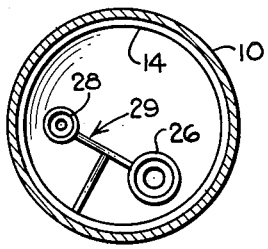
FIGURE 2 is a cross sectional view of the surge alleviator taken in the direction of the arrows 2—2 of FIGURE 1.
Figure 3:
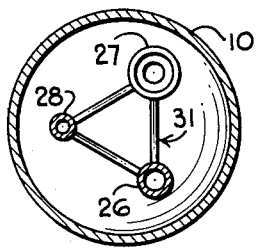
FIGURE 3 is a cross sectional view of the surge alleviator taken in the direction of the arrows 3—3 of FIGURE 1.

Within the chamber 22, tubular members 26 and 28 are supported with a bracing T-shaped structure 29, as more clearly shown in the view of FIGURE 2. A similar construction is employed with a bracing structure 30 connected to the tube 28 and the tube 27 within the chamber 24. Further bracing is provided within the chamber 25 by a triangular-like structure 31 maintaining the tubular members 26, 27, and 28 in stable relationship as more clearly shown in the view of FIGURE 3. It will be further evident from the view of FIGURE 3 that the tubular members 26, 27, and 28 are preferably spaced and supported approximately one hundred twenty degrees apart within the casing 10.

As indicated in the view of FIGURE 1 by the arrows, the flow of fluid is from the left to the right and first passes through the inlet port 17 to the chamber 22. Thereafter, the fluid flow is distributed and divided, part of the flow going through the series tube 28 directly to the chamber 24, and the remainder of the flow going through the branch tube 26 into the chamber 25 to subsequently pass into the branch tube 27 to the chamber 24 and re-unite with the flow from the series tube 28. The total flow then passes outwardly through the port 19.

It will be appreciated that the primary purpose of the fluid surge alleviator of the present invention is to cancel out surges or pulsations which may be produced in the line from a variety of sources as heretofore mentioned. Normally, a given cut-off frequency is known, which may be, for example, the normal design frequency or the normal compressor speed in revolutions per second. With this factor in mind, an important purpose is to lower the cut-off frequency as much as possible while still providing a relatively small and economical structure for the surge alleviator. Towards this end, certain design criteria have been developed, calculated, and applied to the surge alleviator of the present invention with effective results.

Towards this end, in order to balance capacitances throughout the unit, chamber 22 and chamber 24 are designed to have substantially equal volumes while chamber 25 is designed to have a volume approximately twice that of chamber 22, for example. Furthermore, in order to properly balance out the flow through the branch tubes 26 and 27 and the series tube 28, it has been found that the series tube 28 should have a length of approximately one and one-third times the length of the branch tubes 26 and 27, respectively. In addition, for attenuation and proper phase relationship, the internal diameter of the series tube 28 is designed to be approximately two-thirds of the internal diameter of the branch tubes 26 and 27.

By employing these design parameters, it has been found that pressure pulsations in gas lines may be reduced to less than eight percent of the input pulsations and the residual pulsations may be reduced to less than one percent of the line pressure involved. The chambers 22, 25, and 24 tend to smooth out the pulsations and force a phase lag in the fluid passing through the branch tubes 26 and 27, while the remainder of the fluid passing through the series tube 28 chokes out further pulsations. Thereafter, the two streams will unite in the chamber 24 in 180° out-of-phase rleationship and the residual pulsations will be substantially canceled.

A typical performance curve is illustrated in FIGURE 6 whereby it is indicated that substantial attenuation occurs up to nearly five times the cut-off frequency as well as appreciably below the cut-off frequency.

Figure 4:
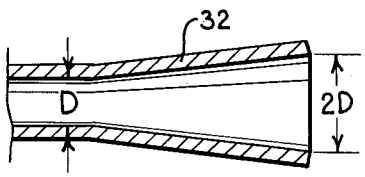
FIGURE 4 is an enlarged view of the venturi type outlet portion of one of the tubular members of FIGURE 1 as indicated by the circled arrows 4.
Figure 5:
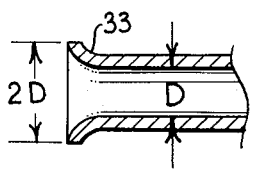
FIGURE 5 is an enlarged view of the inlet portion of one of the tubular members as indicated by the circular arrows 5 of FIGURE 1; and, FIGURE 6 is a typical attenuation curve of a fluid surge alleviator according to the present invention.

An important feature of the present invention resides in provision of venturi type exit portions for the tubular members 26, 27, and 28 as well as bell shaped entrance portions for these members. Thus, referring to FIGURE 4, the tubular member 26 is provided with a diffuser section 32 which has been found to be most desirably shaped by having a maximum diameter of approximately twice the internal diameter of the tube 26. The tubular members 27 and 28 are similarly constructed at their outlet ends. In FIGURE 5 there is shown an enlarged view of a bell shaped entrance portion 33 for the tubular member 27. Again, it has been found most desirable to design the bell shaped entrance portion to have a maximum diameter of twice the diameter of the normal diameter of the tubular member 27. Similarly, the entrance portions of the tubular members 26 and 28 would be of equivalent design.

By using bell shaped entrance portions and venturi type exit portions for the tubular members, it has been found that substantially less pressure drop is obtained and yet a greater decrease in the cut-off frequency for a given volume may be achieved.

It will be appreciated, of course, that many variations may be made in the design criteria employed without departing from the basic structure and features of the present invention. The design criteria set forth are merely illustrative of units which have been constructed with extremely effective and efficient results, although it will be appreciated that variations may be made in the parameters employed according to particular applications. Such changes and modifications are deemed to be within the scope of the present invention as defined by the following claims.

What is claimed is:

1. A fluid surge alleviator comprising: a first chamber having an inlet port; a second chamber having an outlet port; a central chamber; said central chamber, said first chamber, and said second chamber being in axial alignment; means defining a first passage communicating between said first chamber and said central chamber, said first passage having an inlet end in said first chamber and an outlet end in said central chamber, said outlet end being positioned at a point axially closer to said second chamber than to said first chamber; means defining a second fluid passage communicating between said second chamber and said central chamber, said second fluid passage having an outlet end in said second chamber and an inlet end in said central chamber, said inlet end being disposed at a point axially closer to said first chamber than to said second chamber; and means defining a third fluid passage communicating from said first chamber to said second chamber.

2. A fluid surge alleviator, according to claim 1, and a cylindrical casing defining the sidewalls of said first chamber, said second chamber, and said central chamber.

3. A fluid surge alleviator comprising an elongated enclosed casing having an inlet port at one end portion and an outlet port at the other end portion; a first lateral wall near said one end portion defining with said one end portion and said casing a first chamber; a second lateral wall near said other end portion defining with said other end portion and said casing a second chamber, said first lateral wall and said second lateral wall defining therebetween together with said casing a central chamber; means defining a first fluid passage communicating between said first chamber and said central chamber, said first fluid passage having an inlet end in said first chamber and an outlet end in said second chamber, said outlet end being disposed at an axial point closer to said second chamber than to said first chamber; means defining a second fluid passage communicating between said second chamber and said central chamber, said second fluid passage having an outlet end in said second chamber and an inlet end in said central chamber, said inlet end being axially disposed closer to said first chamber than to said second chamber; and means defining a third fluid passage communicating from said first chamber to said second chamber.

4. A fluid surge alleviator, according to claim 3, in which said third fluid passage has an inlet end in said first chamber at the same axial point as said inlet end to said first fluid passage, and in which said third fluid passage has an outlet end in said second chamber at the same axial point as the outlet end from said second fluid passage; and, in which the sum of the axial lengths of said first and second fluid passages exceeds the length of said third fluid passage such that said first and second fluid passages axially overlap each other.

5. A fluid surge alleviator, according to claim 4, in which said first chamber and said second chamber are of a substantially equal given volume, and in which said central chamber is substantially twice said given volume.

6. A fluid surge alleviator, according to claim 5, in which the internal diameter of said third fluid passage is approximately two-thirds of the internal diameter of said first fluid passage and said second fluid passage, respectively.

References Cited in the file of this patent

UNITED STATES PATENTS

| | | |
|---|---|---|
| 1,021,254 | Larkins | Mar. 26, 1912 |
| 2,116,751 | Deremer | May 10, 1938 |

FOREIGN PATENTS

| | | |
|---|---|---|
| 727,961 | Germany | Nov. 16, 1942 |
| 323,515 | Switzerland | Sept. 14, 1957 |